United States Patent [19]

Allam et al.

[11] 3,886,756

[45] June 3, 1975

[54] SEPARATION OF GASES

[75] Inventors: Rodney John Allam, Guildford; Bernard Ramsay Bligh, Hampton Hill, both of England

[73] Assignee: Air Products and Chemicals, Inc., Allentown, Pa.

[22] Filed: May 1, 1973

[21] Appl. No.: 356,264

[30] Foreign Application Priority Data
May 10, 1972 United Kingdom.................... 21984

[52] U.S. Cl. ............................ 62/13; 62/17; 62/39; 48/214
[51] Int. Cl............................................. F25j 3/100
[58] Field of Search ............... 62/10, 23, 24, 25, 12, 62/13, 14, 15, 17; 55/48, 51, 68

[56] References Cited
UNITED STATES PATENTS

| 3,312,073 | 4/1967 | Jackson et al. .......................... 62/12 |
| 3,315,475 | 4/1967 | Harmens................................ 62/17 |
| 3,513,660 | 5/1970 | Becker................................... 62/12 |

OTHER PUBLICATIONS
Guccione "Cryogenic Washing Scrubs Hydrogen for Liquid Fuel Rockets" May 13, 1963 pages 150–152.

Primary Examiner—Norman Yudkoff
Assistant Examiner—D. Sanders
Attorney, Agent, or Firm—Richard A. Dannells, Jr.; Barry Moyerman

[57] ABSTRACT

In the production of carbon monoxide, a method of gas separation is provided which comprises the steps of passing a feed gas mixture which contains hydrogen, carbon monoxide, not more than 1 mol. % carbon dioxide and not more than 1 mol. % water vapor at elevated pressures through and cooling the mixture in a first set of passages in a heat exchanger containing at least two sets of passages in order to deposit the carbon dioxide and water vapor in solid form on the inner surface thereof; countercurrently passing a hydrogen-rich stream at a pressure lower than that of the feed gas mixture through and warming the stream in a second, adjacent set of passages in the heat exchanger in order to re-evaporate substantially all of the solid carbon dioxide and ice previously deposited on the inner surface thereof; and periodically passing the feed gas mixture through the second, adjacent set of passages to deposit the carbon dioxide and water vapor and countercurrently passing the hydrogen-rich stream through the first set of passages to re-evaporate the deposits on the inner surface thereof.

6 Claims, 1 Drawing Figure

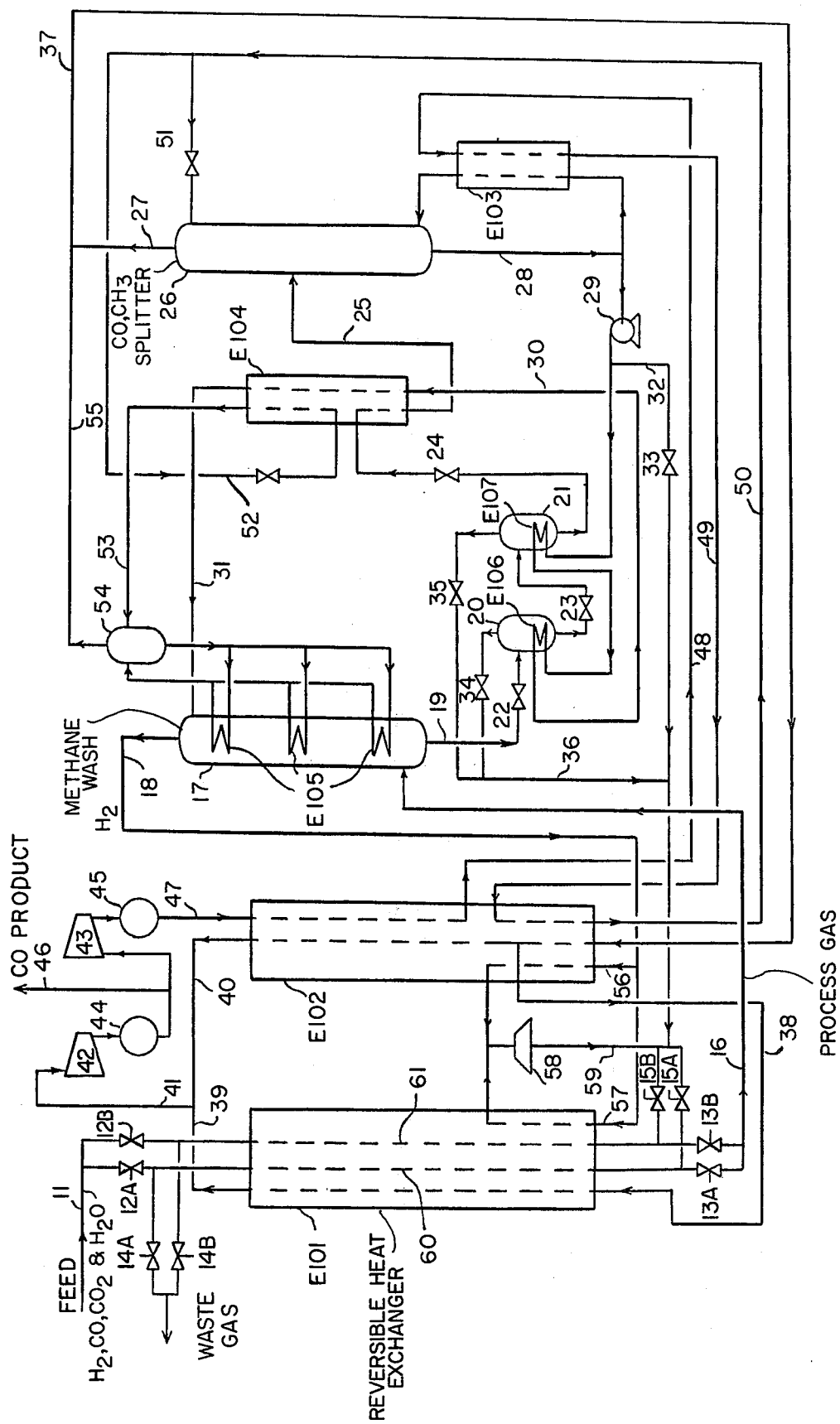

3,886,756

SEPARATION OF GASES

BACKGROUND OF THE INVENTION

1. Field of the Invention

This invention relates to the separation of gases, and more particularly the obtaining of a carbon monoxide product from a mixture of gases including hydrogen, carbon monoxide and small amounts of carbon dioxide.

2. Description of the Prior Art

A number of processes are known for producing mixtures of hydrogen, carbon monoxide and carbon dioxide. A typical one is the steam reforming of natural gas, and the product from this reforming process contains hydrogen, nitrogen, carbon monoxide, carbon dioxide, methane and water vapor. It has been proposed to use a cryogenic process in order to obtain a carbon monoxide product from this mixture; one such process is described in our co-pending patent application number 14896/70; another such process is described in "Chemical and Process Engineering", March, 1972, Page 5. However, water and carbon dioxide solidify at low temperatures, and therefore provision must be made for the removal of these contaminants before the application of the cryogenic process. Hitherto, this removal has been done partly by an absorption process which removes the greater part of the carbon dioxide, and partly by an adsorption process in which the last traces of carbon dioxide and water vapor are removed by a solid adsorbent.

SUMMARY OF THE INVENTION

It is an object of the present invention to provide a more economic process for the production of a carbon monoxide stream by the elimination of the adsorption step.

According to the present invention there is provided a cooling process operating in a heat exchanger containing at least two sets of passages, wherein:

a. A feed gas mixture at elevated pressure, which contains hydrogen, carbon monoxide, not more than 1.0% carbon dioxide and not more than 1.0% water vapor (both measured as molar percentages) is cooled in one set of passages, and the carbon dioxide and water vapor are deposited in solid form on the surfaces of the said passages;

b. A hydrogen-rich stream at a lower pressure than said feed gas pressure flows in the reverse direction and is warmed in an adjacent set of passages, in which previously deposited solid carbon dioxide and ice are re-evaporated by said hydrogen-rich stream;

c. Switching valves are provided such that the feed gas mixture and the hydrogen-rich stream can be switched periodically from one set of passages to another.

The feed gas mixture at (a) above may also optionally contain small quantities of nitrogen and methane.

The manner in which this invention may be utilized in practice will become evident in the process description, given by way of example, which follows. It will be appreciated that in a process according to the present invention the hydrogen-rich stream becomes contaminated with water vapor and carbon dioxide, and therefore this hydrogen-rich stream in not, in the form leaving the plant, suitable for processes requiring high purity hydrogen; nevertheless, the hydrogen-rich stream may find a use as fuel gas. This stream is referred to in the subsequent process description as "waste gas". Alternatively, the hydrogen-rich stream, which is contaminated with up to 1% carbon dioxide, as well as a small proportion of carbon monoxide and methane, can, after heating to a suitable temperature, be passed through a chamber containing a bed of methanation catalyst where the carbon dioxide and carbon monoxide are converted to methane. The resultant purity of the hydrogen would, using the example given, be about 96%.

In the process which is about to be described, it is the object to separate a substantially pure stream of carbon monoxide from the raw gas from a steam reformer. The raw gas is put through an absorption process, typically a Benfield process, in order to remove a major fraction of carbon dioxide. The gas is cooled in water coolers to condense out as much water as possible. The process gas then contains hydrogen, nitrogen, carbon monoxide, methane and small quantities of carbon dioxide and water vapor. The carbon dioxide molar proportion is less than 1%, and preferably about 0.2%; and the water vapor content is also less than 1%.

DESCRIPTION OF THE INVENTION AND DRAWING

The accompanying drawing is a flow scheme of the process embodying the invention now to be described. Process gas, after the pretreatment described in the previous paragraph, enters the process at line 11. The process gas at about 166 psia is cooled in heat exchanger E.101 after passing through one of the switch valves 12A, 12B. In this heat exchanger water vapor and carbon dioxide solidify out, and the process gas, which is freed of these impurities, leaves the heat exchanger E.101 via one of the check valves 13A, 13B at about −274°F.

The process gas is then fed by line 16 to a methane wash column 17 which it enters near the bottom. The wash column contains a number of cooling coils and contactors E105 as described in our co-pending patent application No. 14896/70. These cooling coils and contactors are refrigerated by liquid carbon monoxide in the range −290° to −297°F. The top of the wash column 17 is fed with liquid methane via line 31. Hydrogen of about 97% purity leaves the top of the methane wash column via line 18 and the bottom liquid at line 19 contains methane, carbon monoxide, nitrogen and a small amount of hydrogen.

The methane wash column operates at about 160 psia (in the present example); the pressure of the bottom liquid 19 is let down in two stages by valves 22 and 23 into separator vessels 20 and 21, respectively, which vessels are typically at 100 psia and 70 psia. The purpose of these pressure let-down valves and separator vessels is to remove hydrogen from the liquid with a minimum loss of carbon monoxide. The liquid from the vessel 21 is passed through a valve 24, partially vaporized in heat exchanger E.104 and fed via line 25 into a distillation column 26.

Distillation column 26 is a carbon monoxide/methane splitter, which operates at about 41 psia. Carbon monoxide and nitrogen leave the top of column 26 via line 27. The bottom liquid, which is substantially pure methane, leaves via line 28. The reboiler for column 26 is shown at E.103. Liquid methane from line 28 is raised in pressure by a pump 29 to about 170 psia. The liquid methane is cooled successively in cooling coils E.107 and E.106, and then fed via line 30 to be further cooled in heat exchanger E.104. In this way the liquid methane is cooled to −290°F, which is the appropriate temperature for the liquid methane to enter the wash column 17 via line 31.

The cooling coils E.106 and E.107 are in the bottoms of the respective vessels 20 and 21. The vapors from vessels 20 and 21 pass through respective pressure control valves 34 and 35 and join up at line 36.

If the sump of the column 26 becomes over-full with liquid methane, some is bled off from the discharge of the pump 29 via line 32 and control valve 33; this bleed also joins line 36.

The operation of the plant is assisted by a heat-pump circuit of carbon monoxide, which will now be described. Carbon monoxide (line 27) at about −296°F and 40 psia joins line 37 and enters the cold end of heat exchanger E.102. Where the carbon monoxide is at about −275°F a side stream is taken off via line 38 to heat exchanger E.101. The two streams of carbon monoxide are warmed to ambient temperature in the heat exchangers E.101 and E.102, and the respective streams 39 and 40 are rejoined at line 41. The carbon monoxide is then compressed in a two-stage compressor 42 and 43 fitted with coolers 44 and 45. The carbon monoxide product is suitably withdrawn between stages at line 46.

The high pressure carbon monoxide leaving the cooler 45 via line 47 is at about 406 psia and 80°F (line 47); it is cooled in heat exchanger E.102 to about −204°F and then it is taken via line 48 to be condensed in heat exchanger E.103 which is the reboiler for the column 26. The condensed carbon monoxide at −230°F is returned to heat exchanger E.102 via line 49. The liquid carbon monoxide is sub-cooled in the cold end of heat exchanger E.102 and leaves via line 50. This stream is then divided in two. One stream provides reflux to the column 26 by way of an expansion valve 51. The second stream is let down to about 41 psia via valve 52. This stream cools the liquid methane in heat exchanger E.104. The carbon monoxide stream, which is now partially vaporized, leaves heat exchanger E.104 via line 53 and enters a disengagement vessel 54. Vapor leaves vessel 54 via line 55 to join the circuit at line 37 which has already been described. The liquid carbon monoxide in vessel 54 runs by gravity to the cooling coils and contactors E.105 and boils therein; in this way refrigeration is provided to the methane wash column 17 which has already been described.

Refrigeration for the plant is obtained by means of an expansion engine in a manner now described. Hydrogen at −290°F from the top of the methane wash column (line 18) is split into two streams 56 and 57 and these enter the cold ends of exchangers E.102 and E.101, respectively. The hydrogen stream in exchanger E.102 is withdrawn at a temperature of about −230°F and the hydrogen stream in exchanger E.101 is withdrawn at a temperature of about −213°F. These two streams are now rejoined and enter an expansion engine 58 which is preferably an expansion turbine. The hydrogen leaves the expansion turbine at about −278°F and about 30 psia (line 59). This hydrogen stream is then joined by the mixed vapors from line 36 and the methane bleed from valve 33 (both mentioned previously). The total of these joined streams is referred to herein as the "waste gas". Alternatively, if a hydrogen product stream is required the mixed vapor from line 36 and the methane bleed from line 32 are removed through separate passages in exchanger E.101 or E.102.

The cold waste gas passes through one of valves 15A, 15B and along one set of passages to the warm end of the heat exchanger E.101 and then leaves the system at ambient temperature via one of valves 14A, 14B. The heat exchanger E.101 is a switching heat exchanger, as known in the art of air separation by low temperature distillation. The feed gas is cooled in the passages denoted by line 60, while the waste gas is warmed in the passages denoted by line 61. During this part of the operation ice and solid carbon dioxide are deposited in the passages 60. Before the passages 60 become completely blocked, the valve 12A is closed and the valve 12B is opened, so that the feed gas is sent along the passages 61. At the same time the pairs of valves 13A, 13B, 14A, 14B and 15A, 15B, are changed over. In this way the waste gas is sent along the passages 60 and the solid deposits therein are re-evaporated; hence the passages 60 are cleared and ready for the next change over of the valves.

If the plant is to operate for long periods it is obvious that the re-evaporation of solid deposits must be substantially complete at each switch-over of valves. This stipulation requires certain characteristics:

a. The pressure of the waste gas must be less than that of the feed gas. In the example given, the waste gas can be removed from the warm end of heat exchanger E.101 at pressures up to about 40 psia and still achieve adequate removal of $CO_2$ deposited from the feed gas stream.

b. The temperature difference between the feed gas and the waste gas at adjacent points in the heat exchanger must be less than 15°F, and preferably in the region of 10°F, particularly in the temperature range from −175°F to −274°F where $CO_2$ deposits.

c. The amount of hydrogen passing through line 57 to the hydrogen reheat passages of heat exchanger E.101 is adjusted in flowrate and withdrawal temperature so that the temperature difference between the reversing streams at the cold end of heat exchanger E.101 is small enough to ensure adequate removal of $CO_2$ deposits.

The last two stipulations cannot be maintained if the heat exchangers E.101 and E.102 are incorporated together. It is an important feature of the design that the high pressure stream 47 is cooled separately from the feed gas stream.

Although switching heat exchangers are known, they have not been applied previously to carbon monoxide plants. The effective use of switching heat exchangers in the type of carbon monoxide plant just described becomes possible if the above stipulations are adhered to.

What we claim is:

1. A method of separating a feed gas mixture obtained by the steam reforming of natural gas followed by the removal of a substantial portion of the carbon dioxide by an absorption process and the water vapor by condensation which mixture contains hydrogen, carbon monoxide, not more than 1 mol. % carbon dioxide, not more than 1 mol. % water vapor and small quantities of nitrogen and methane for the production of carbon monoxide which comprises:

a. passing said feed mixture through and cooling said mixture in a first set of passages in a heat exchanger containing at least two sets of passages to deposit said carbon dioxide and water vapor in solid form on the inner surface thereof;

b. countercurrently passing a hydrogen-rich stream at a pressure lower than that of said feed gas mixture through and warming said stream in a second, adjacent set of passages in said heat exchanger;

c. periodically passing said feed gas mixture through and cooling said mixture in said second set of passages to deposit said carbon dioxide and water vapor on the inner surface thereof and countercurrently passing said hydrogen-rich stream through and warming said stream in said first set of passages to re-evaporate substantially all of the solid carbon dioxide and ice deposited on the inner surface thereof;

d. passing the cooled feed gas mixture from said heat exchanger into the bottom of a methane wash column;

e. expanding the hydrogen stream recovered from the top of said column and recycling at least a part of said hydrogen to said heat exchanger as said hydrogen-rich stream;

f. letting down the pressure of the liquid withdrawn from the bottom of said wash column to effect further hydrogen removal;

g. partially vaporizing said liquid from step (f) and passing the resulting stream into a distillation column to separate carbon monoxide product from the methane; and h. recovering said carbon monoxide product.

2. The method of claim 1 wherein liquid methane from the bottom of said distillation column is pumped to a higher pressure, cooled and returned to the top of said wash column.

3. The method according to claim 2 wherein the carbon monoxide stream leaving the top of said distillation column enters a carbon monoxide heat-pump circuit that provides cooling for said heat exchanger and internal refrigeration to said methane wash column.

4. A method of separating a feed gas mixture obtained by the steam reforming of natural gas followed by the removal of a substantial portion of the carbon dioxide by an absorption process and the water vapor by condensation which mixture contains hydrogen, carbon monoxide, not more than 1 mol. % carbon dioxide, not more than 1 mol. % water vapor and small quantities of nitrogen and methane for the production of carbon monoxide which comprises:

a. passing said feed mixture through and cooling said mixture in a first set of passages in a heat exchanger containing at least two sets of passages to deposit said carbon dioxide and water vapor in solid form on the inner surface thereof;

b. countercurrently passing a hydrogen-rich stream at a pressure lower than that of said feed gas mixture through and warming said stream in a second, adjacent set of passages in said heat exchanger;

c. periodically passing said feed gas mixture through and cooling said mixture in said second set of passages to deposit said carbon dioxide and water vapor on the inner surface thereof and countercurrently passing said hydrogen-rich stream through and warming said stream in said first set of passages to re-evaporate substantially all of the solid carbon dioxide and ice deposited on the inner surface thereof;

d. passing the cooled feed gas mixture from said heat exchanger into the bottom of a methane wash column;

e. expanding the hydrogen stream recovered from the top of said column and recycling at least a part of said hydrogen to said heat exchanger as said hydrogen-rich stream;

f. letting down the pressure of the liquid withdrawn from the bottom of said wash column to effect further hydrogen removal;

g. partially vaporizing said liquid from step (f) and passing the resulting stream into a distillation column to separate carbon monoxide product from the methane;

h. pumping to a higher pressure, cooling and returning to the top of said wash column said liquid methane from the bottom of said distillation column;

i. passing said carbon monoxide stream leaving the top of said distillation column through a carbon monoxide heat-pump circuit to provide cooling for said heat exchanger and internal refrigeration to said methane wash column;

j. warming said carbon monoxide stream from the top of said distillation column by passing a part thereof through said heat exchanger and another part to a second, separate heat exchanger;

k. compressing the recombined, warmed stream from the first and second heat exchangers to a high pressure;

l. withdrawing a portion of said compressed stream as the carbon monoxide product;

m. cooling the remaining portion of said compressed stream by returning it to said second heat exchanger;

n. withdrawing the remaining portion of said compressed stream being cooled in said second separate heat exchanger at an intermediate point, condensing it in the reboiler of said distillation column, and returning the condensed stream to continue passage to the cold end of said second heat exchanger;

o. expanding the cooled, compressed stream on leaving said second heat exchanger to provide reflux for said distillation column; and p. expanding and employing the remaining part of said cooled, compressed stream to provide refrigeration for said methane wash column.

5. The method according to claim 4 wherein the compression of said recombined, warmed stream takes place in two stages with intercooling between stages and wherein said carbon monoxide product is withdrawn between the compression stages.

6. The method according to claim 4 wherein said hydrogen from the top of the said wash column is split into two portions, and passed through passages at the cold ends of both of said heat exchangers prior to being expanded in step (e).

* * * * *